US011858098B2

(12) United States Patent
Evatt et al.

(10) Patent No.: US 11,858,098 B2
(45) Date of Patent: Jan. 2, 2024

(54) STAPLER

(71) Applicant: TECHTRONIC CORDLESS GP, Anderson, SC (US)

(72) Inventors: Thomas Evatt, Six Mile, SC (US); Jeremy Fedrigon, Greenville, SC (US); Trevor C. Fauss, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 17/821,927

(22) Filed: Aug. 24, 2022

(65) Prior Publication Data

US 2023/0064021 A1 Mar. 2, 2023

Related U.S. Application Data

(60) Provisional application No. 63/237,944, filed on Aug. 27, 2021.

(51) Int. Cl.
*B25C 11/00* (2006.01)
*B25C 5/11* (2006.01)

(52) U.S. Cl.
CPC ................ *B25C 11/00* (2013.01); *B25C 5/11* (2013.01)

(58) Field of Classification Search
CPC ... B25C 11/00; B25C 5/11; B25C 7/00; B25F 1/04
See application file for complete search history.

(56) References Cited

U.S. PATENT DOCUMENTS

| | | | | |
|---|---|---|---|---|
| 6,224,035 | B1 * | 5/2001 | Parkhe | B25C 5/025 254/28 |
| 2010/0006618 | A1 * | 1/2010 | Ambjornsson | B25C 5/025 227/120 |
| 2012/0018486 | A1 * | 1/2012 | Chen | B25C 5/1617 227/120 |
| 2012/0110745 | A1 * | 5/2012 | Hanlon | B25C 11/00 7/138 |
| 2018/0117750 | A1 * | 5/2018 | Thiyagarajan | B25C 5/1689 |

OTHER PUBLICATIONS

Arrow, "Arrow Staple Puller," available at <https://www.lowes.com/pd/Arrow-Staple-Puller/999957999> web page visited Aug. 27, 2021 (4 pages).

* cited by examiner

*Primary Examiner* — Anna K Kinsaul
*Assistant Examiner* — Veronica Martin
(74) *Attorney, Agent, or Firm* — Michael Best & Friedrich LLP

(57) ABSTRACT

The present disclosure is directed to a fastener driver for driving a fastener into a workpiece. The fastener driver includes a housing and a lever pivotably coupled to the housing and actuable to cause the fastener driver to drive the fastener into the workpiece. The fastener driver also includes fastener puller removably coupled to the housing and operable to remove the fastener from the workpiece. The fastener puller includes a base portion, a removal head, and a pivot region. The removal head is affixed to the base portion and configured to pry the fastener from the workpiece. The removal head has a flat shape. The pivot region is defined between the removal head and the pair of legs. The pivot region is configured to contact the workpiece such that during operation the fastener puller pivots about the pivot region relative to the workpiece.

6 Claims, 12 Drawing Sheets

STAPLER

CROSS-REFERENCE TO RELATED APPLICATIONS

This application claims priority to U.S. Provisional Patent Application No. 63/237,944, filed Aug. 27, 2021, the entire content of which is hereby incorporated by reference.

FIELD OF THE DISCLOSURE

The disclosure relates to fastener drivers, and more specifically, to staplers including integrated fastener pullers for removing fasteners such as staples or nails.

BACKGROUND OF THE DISCLOSURE

In a stapler, one or more fastener pullers may be provided for removing fasteners, such as staples or nails, from workpieces.

SUMMARY OF THE DISCLOSURE

The present disclosure provides, in one aspect, a fastener driver for driving a fastener into a workpiece. The fastener driver includes a housing and a lever pivotably coupled to the housing and actuable to cause the fastener driver to drive the fastener into the workpiece. The fastener driver also includes fastener puller removably coupled to the housing and operable to remove the fastener from the workpiece. The fastener puller includes a base portion, a removal head, and a pivot region. The removal head is affixed to the base portion and configured to pry the fastener from the workpiece. The removal head has a flat shape. The pivot region is defined between the removal head and the pair of legs. The pivot region is configured to contact the workpiece such that during operation the fastener puller pivots about the pivot region relative to the workpiece.

The present disclosure provides, in another aspect, a fastener puller operable to remove a fastener from a workpiece, the fastener puller being configured to removably couple to a fastener driver. The fastener puller includes a pair of legs, each leg including a hook at a distal end of the leg. The fastener puller also includes a removal head affixed to the legs and configured to pry the fastener from the workpiece. The removal head has a flat shape. The fastener puller further includes a pivot region defined between the removal head and the pair of legs. The pivot region is configured to contact the workpiece such that during operation the fastener puller pivots about the pivot region relative to the workpiece.

The present disclosure provides, in another aspect, a fastener driver for driving a fastener into a workpiece. The fastener driver includes a housing, a lever pivotably coupled to the housing, and a fastener puller. The lever is actuable to cause the fastener driver to drive the fastener into the workpiece. The fastener puller is movably coupled to the housing and operable to remove the fastener from the workpiece. The fastener puller is movable relative to the housing between a retracted position and an extended position.

Other aspects of the disclosure will become apparent by consideration of the detailed description and accompanying drawings.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
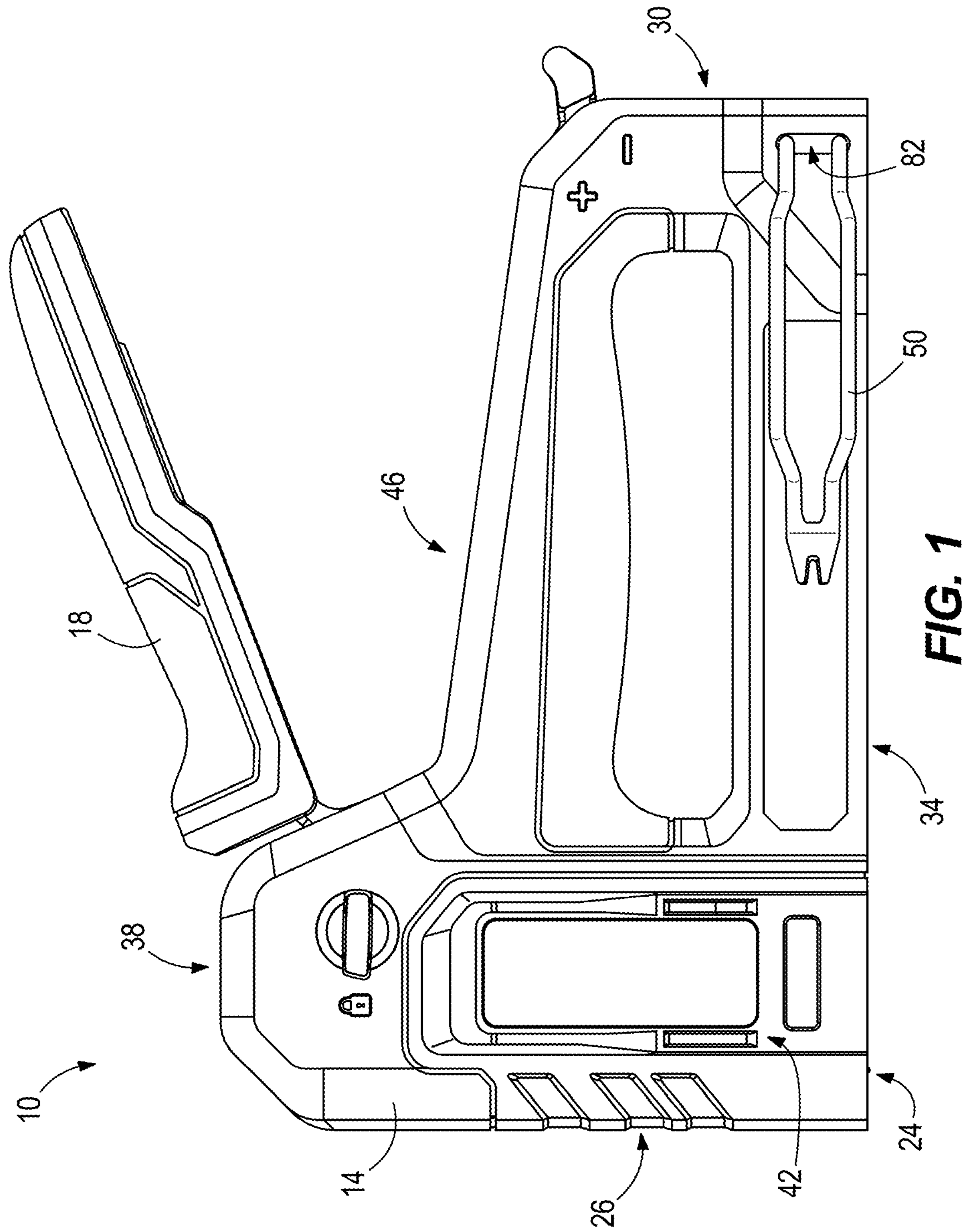
FIG. 1 is a side view of a stapler including a fastener puller.

FIG. 1 illustrates a fastener driver, such as a stapler 10, for driving fasteners into a workpiece. The stapler 10 includes a housing 14 and a handle or lever 18 pivotably coupled to the housing 14. The housing 14 contains a drive mechanism (not shown) operable to force a fastener 22 (FIG. 3A), such as a staple 22*a* or a nail 22*b*, through an ejection opening 24 formed in the housing 14 and into the workpiece. The lever 18 is pivotable to actuate the drive mechanism to perform the fastening operation.

The housing 14 includes a front side 26, a rear side 30 opposite the front side 26, a bottom side 34, a top side 38 opposite the bottom side 34, a first lateral side 42, and a second lateral side 46 opposite the first lateral side 42. In the illustrated embodiment, the lever 18 is coupled to the top side 38 of the housing 14 at a location near the front side 26. The ejection opening 24 is defined in the bottom side 34 of the housing 14 at a location near the front side 26. Other embodiments include different locations for the lever 18 and the ejection opening 24.

Figure 2A:
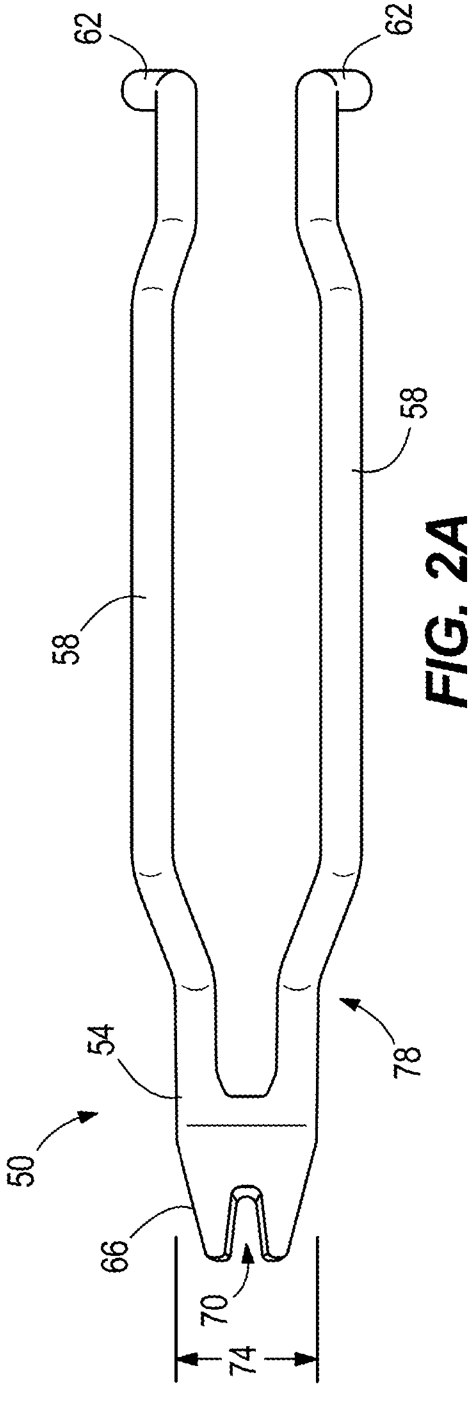
FIGS. 2A and 2B are top views of the fastener puller of FIG. 1.

With continued reference to FIG. 1, the stapler 10 includes a removal tool or fastener puller 50 coupled to the housing 14 and selectively removable from the housing 14 for removing fasteners from a workpiece. The fastener puller 50 includes a removal head 54 and a pair of branching legs 58 affixed to the removal head 54 and extending away therefrom. The legs 58 extend in a generally parallel manner and terminate at their distal ends as a pair of hooks 62. The hooks 62 face away from one another. The removal head 54 is generally flat in shape and includes a forked tip portion 66 that defines a V-shaped nail slot 70. The nail slot 70 is shaped to receive a head of a nail 22*b*. The removal head 54 has a lateral width 74 sized to fit between the legs of a staple 22*a* as the removal head 54 is slid underneath the top member of the staple 22*a*. The removal head 54 is generally bent away from the legs 58 (in a direction generally out of plane as viewed in FIGS. 2A, 2B) such that a pivot region 78 is defined between the removal head 54 and the legs 58. In operation, the fastener puller 50 is placed with the pivot region 78 abutted against the workpiece, and the tip portion 66 is engaged with an embedded fastener (nail or staple). The legs 58 are then pressed toward the workpiece, causing the fastener puller 50 to pivot about the pivot region 78 and the tip portion 66 to pry the fastener away from the workpiece. According to one or more embodiments, the legs 58 form a base portion of the fastener puller 50.

Figure 2B:
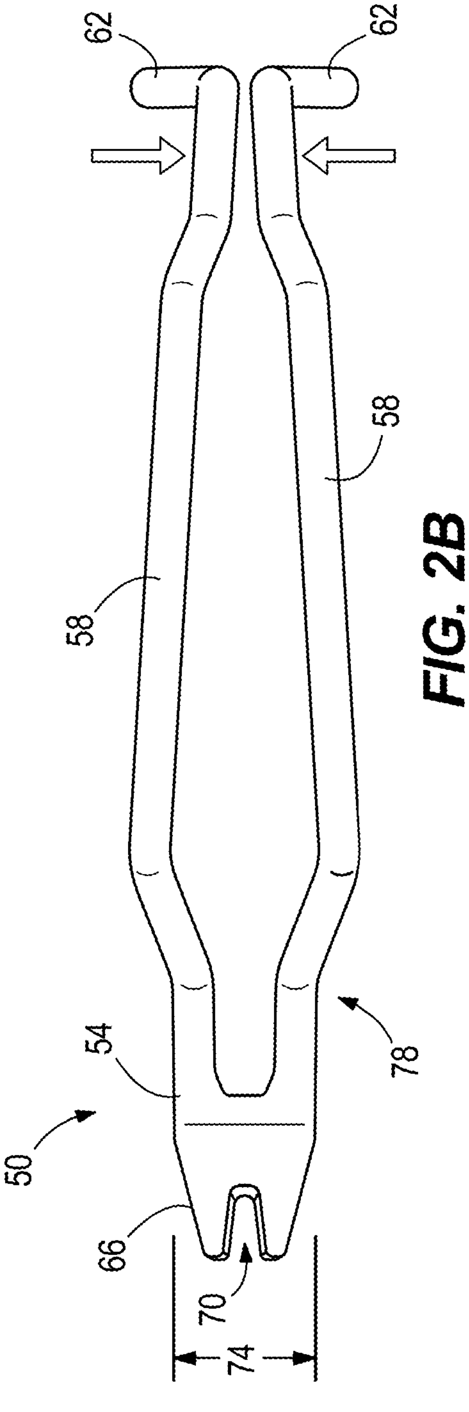

As shown in FIGS. 1-2B, the housing 14 defines a fastener puller receptacle 82 that selectively receives the hooks 62 of the fastener puller 50 to couple the fastener puller 50 to the stapler 10. In the illustrated embodiment, the fastener puller receptacle 82 is formed as a recess in the first lateral side 42 of the housing 14, although in other embodiments the recess may be located elsewhere along the stapler 10. To couple the fastener puller 50 to the housing 14, the legs 58 are pressed (squeezed) laterally toward one another (in a direction of the arrows in FIG. 2B) into a squeezed position, and then the hooks 62 are inserted into the fastener puller receptacle 82. The legs 58 are then released to assume their natural shape (released position), causing the hooks 62 to move away from one another and engage the edges of the housing 14 to thereby secure the fastener puller 50 to the stapler 10. To uncouple the fastener puller 50 from the stapler 10, the legs 58 are again pressed laterally toward one another, causing the hooks 62 to disengage from the housing 14, and then the hooks 62 are removed from the fastener puller receptacle 82.

In addition to being operable to remove fasteners, the fastener puller 50 is also operable as a belt clip for clipping the stapler 10 to the belt or other clothing or accessory of a user. Specifically, when the fastener puller 50 is secured to the fastener puller receptacle 82, the removal head 54 may be slid over the belt of the user to hang the stapler 10 from the belt.

Figure 3A:
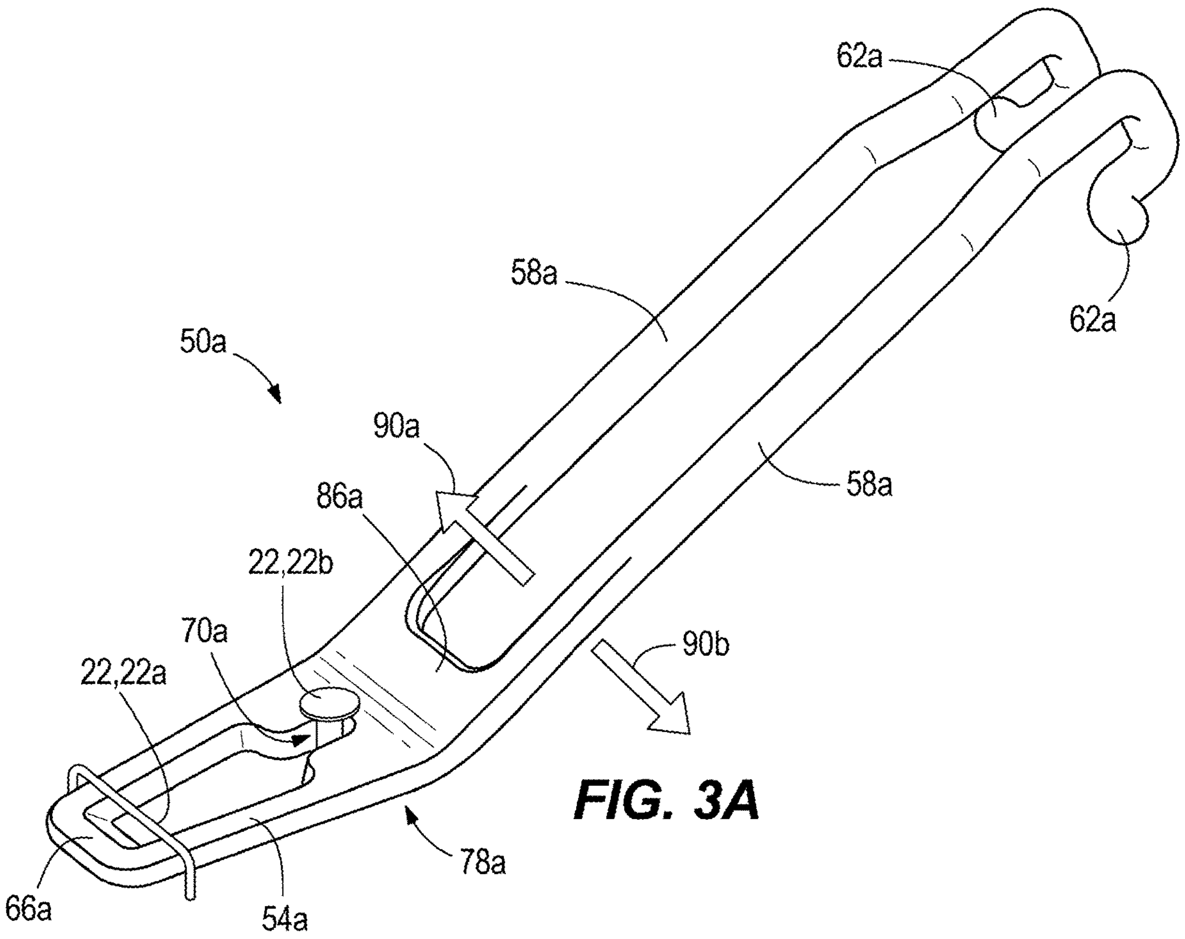
FIG. 3A is a perspective view of a fastener puller that is selectively attachable to the stapler of FIG. 1, according to another embodiment.
Figure 3B:
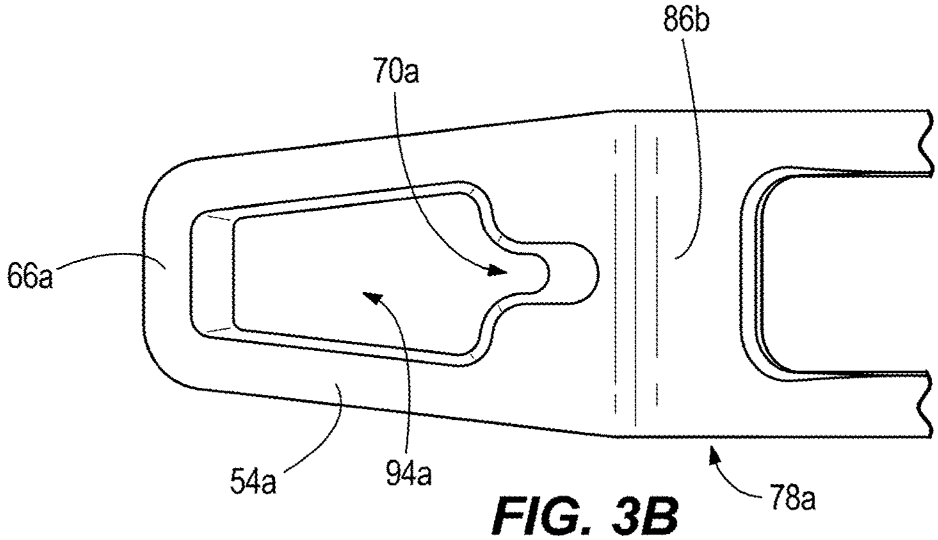
FIG. 3B is a top view of a portion of the fastener puller of FIG. 3A.

FIGS. 3A and 3B illustrate a fastener puller 50*a* according to another embodiment. The fastener puller 50*a* includes a removal head 54*a* with a closed tip portion 66*a* for sliding underneath a staple 22*a*. The fastener puller 50*a* also includes a cross member 86*a* formed in a pivot region 78*a*, with a nail slot 70*a* defined in the cross member 86*a*. An aperture or window 94*a* is formed in the removal head 54*a* between the closed tip portion 66*a* and the cross member 86*a*. The removal head 54*a*, including the tip portion 66*a* and the cross member 86*a*, is generally flat in shape. The fastener puller 50*a* also includes a pair of legs 58*a* affixed to the removal head 54*a* and extending away therefrom generally parallel to one another. The legs 58*a* terminate at their distal ends as a pair of oppositely-facing hooks 62*a*. Unlike the removal head 54*a*, the legs 58*a* are not flat in shape but instead are formed as elongated bars having a round (e.g., circular) cross-sectional shape. The fastener puller 50*a* may be coupled to the stapler 10 (or to a user's belt) in a manner identical that described above for the fastener puller 50. According to one or more embodiments, the legs 58*a* form a base portion of the fastener puller 50*a*.

To remove a nail 22*b* from the workpiece, the head of the nail 22*b* is fitted into the nail slot 70*a* and the legs 58*a* are pulled away from the workpiece (in a direction of the arrow 90*a*). To remove a staple 22*a* from the workpiece, the tip portion 66*a* is slid beneath the staple 22*a* and then the legs 58*a* are pressed toward the workpiece (in a direction of the arrow 90*b*).

Figure 4A:
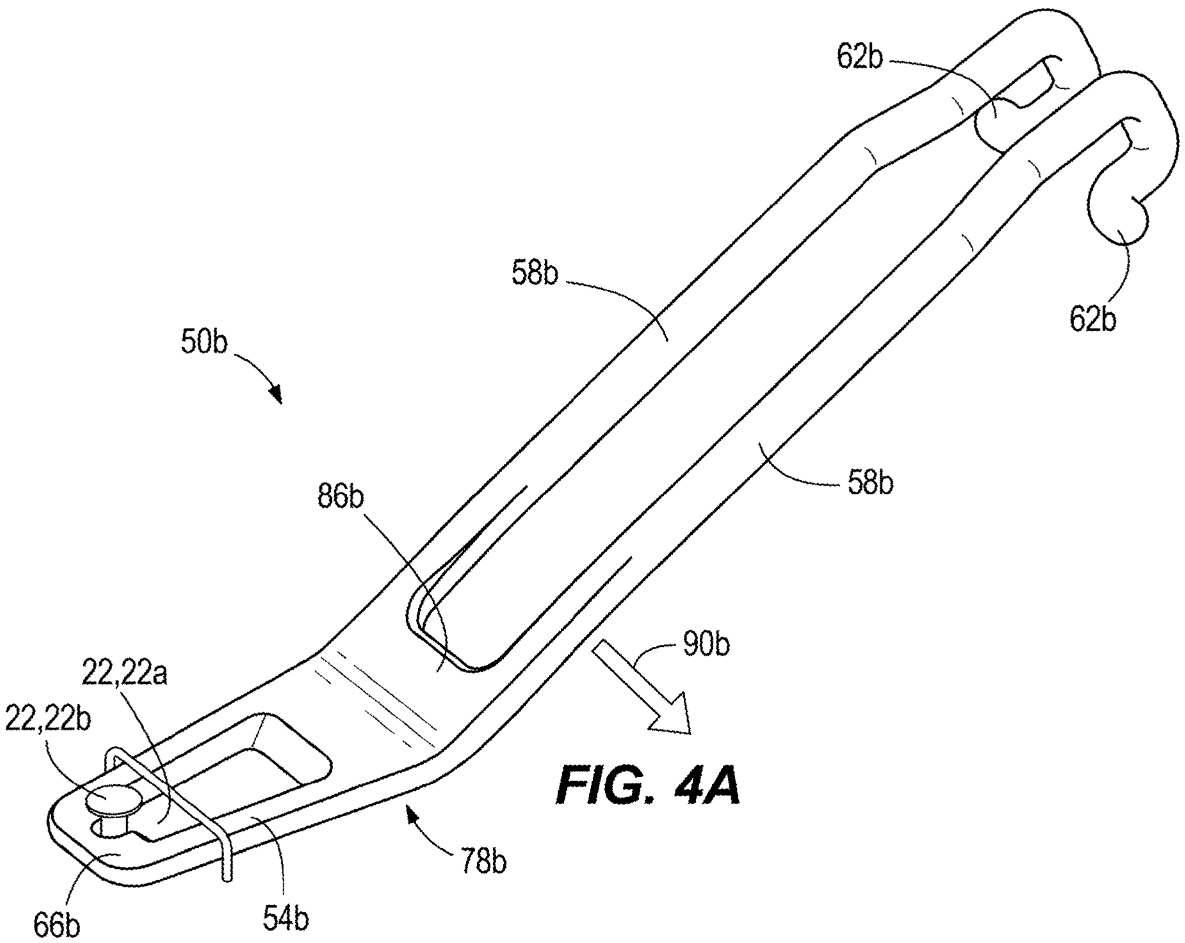
FIG. 4A is a perspective view of a fastener puller that is selectively attachable to the stapler of FIG. 1, according to another embodiment.
Figure 4B:
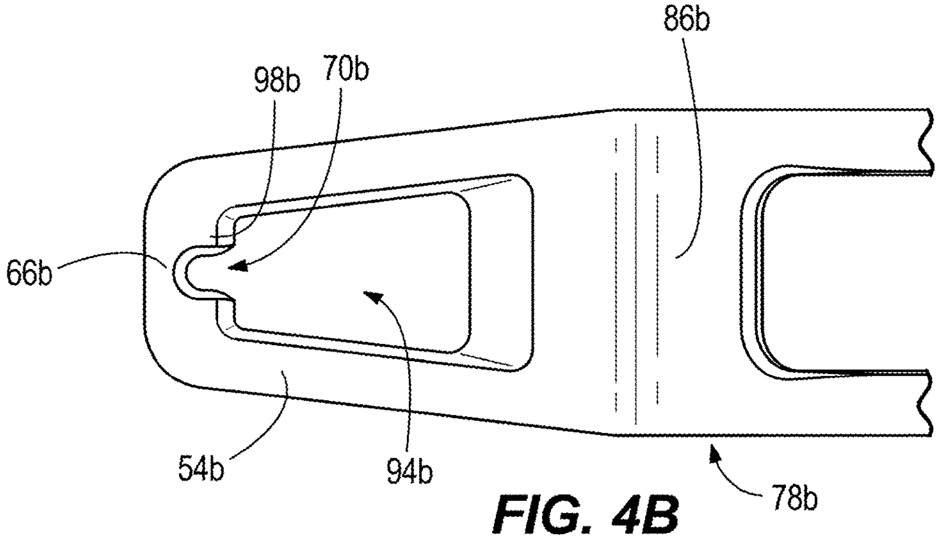
FIG. 4B is a top view of a portion of the fastener puller of FIG. 4A.

FIGS. 4A and 4B illustrate a fastener puller 50*b* according to another embodiment. The fastener puller 50*b* includes a removal head 54*b* with a closed tip portion 66*b* for sliding underneath a staple 22*a*. The fastener puller 50*b* also includes a cross member 86*b* formed in a pivot region 78*b*. An aperture or window 94*b* is formed in the removal head 54*b* between the closed tip portion 66*b* and the cross member 86*b*. A nail slot 70*b* is defined in an inside edge 98*b* of the window 94*b* adjacent the tip portion 66*b*. The removal head 54*b*, including the tip portion 66*b* and the cross member 86*b*, is generally flat in shape. The fastener puller 50*b* also includes a pair of legs 58*b* affixed to the removal head 54*b* and extending away therefrom generally parallel to one another. The legs 58*b* terminate at their distal ends as a pair of oppositely-facing hooks 62*b*. Unlike the removal head 54*b*, the legs 58*b* are not flat in shape but instead are formed as elongated bars having a round (e.g., circular) cross-sectional shape. The fastener puller 50*b* may be coupled to the stapler 10 (or to a user's belt) in a manner identical that described above for the fastener pullers 50 and 50*a*. According to one or more embodiments, the legs 58*b* form a base portion of the fastener puller 50*b*.

To remove a nail 22*b* from the workpiece, the head of the nail 22*b* is fitted into the nail slot 70*b* and the legs 58*b* are pressed toward the workpiece (in a direction of the arrow 90*b*). To remove a staple 22*a* from the workpiece, the tip portion 66*b* is slid beneath the staple 22*a* and then the legs 58*b* are pressed toward the workpiece (in a direction of the arrow 90*b*).

Figure 4C:
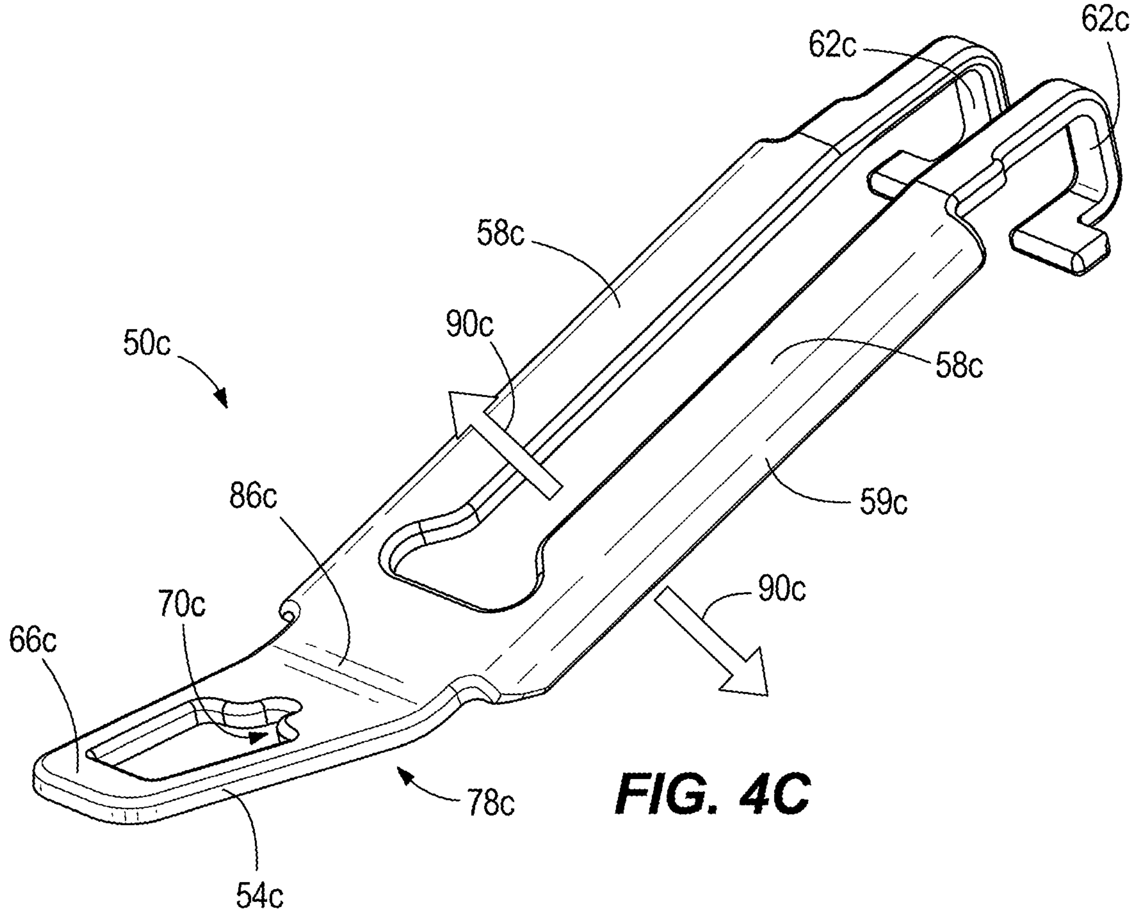
FIG. 4C is a perspective view of a fastener puller that is selectively attachable to the stapler of FIG. 1, according to another embodiment
Figure 4D:
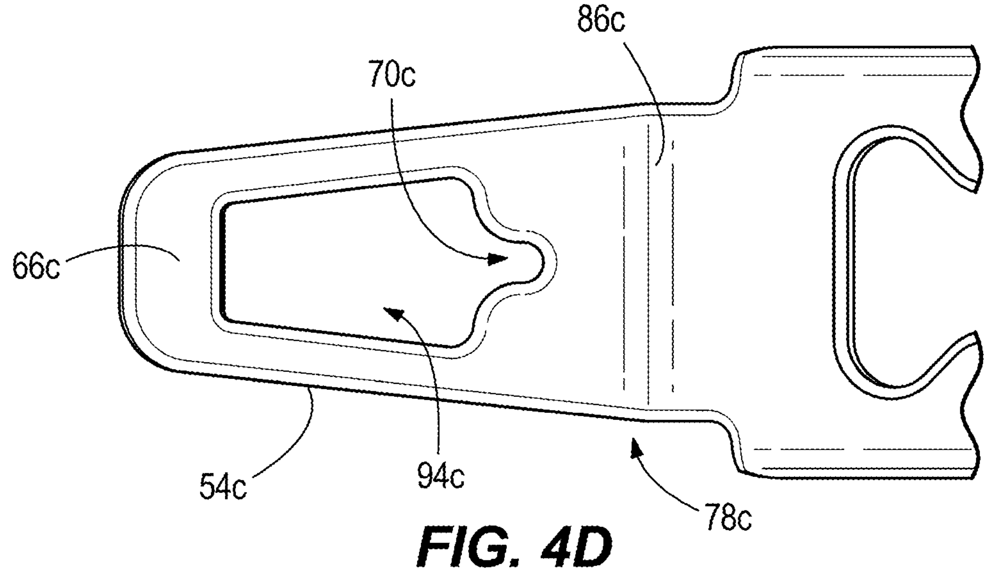
FIG. 4D is a top view of a portion of the fastener puller of FIG. 4C.

FIGS. 4C and 4D illustrate a fastener puller 50*c* according to another embodiment. The fastener puller 50*c* includes a removal head 54*c* with a closed tip portion 66*c* for sliding underneath a staple 22*a*. The fastener puller 50*c* also includes a cross member 86*c* formed in a pivot region 78*c*. An aperture or window 94*c* is formed in the removal head 54*c* between the closed tip portion 66*c* and the cross member 86*c*. A nail slot 70*c* is defined in the cross member 86*c* adjacent the window 94*c*. The removal head 54*c*, including the tip portion 66*c* and the cross member 86*c*, is generally flat in shape. The fastener puller 50*c* also includes a pair of legs 58*c* affixed to the removal head 54*c* and extending away therefrom generally parallel to one another. The legs 58*c* terminate at their distal ends as a pair of oppositely-facing hooks 62*c*. Like the removal head 54*c*, the legs 58*c* are also generally flat in shape. The fastener puller 50*c* may be formed from a metal plate or sheet by a stamping process. In the illustrated embodiment, the removal head 54*c* undergoes a hardening process to provide it with increased strength for pulling the staple 22*a* or the nail 22*b*. The legs 58*c* do not undergo the hardening process, and as such, they retain flexibility and can be squeezed toward one another to couple the hooks 62*c* to the housing 14 of the stapler 10. Each leg 58*c* also includes an elongated tab 59*c* extending along its outer side and bent downward, i.e., away from a primary portion of the leg 58*c*. The tabs 59*c* add strength to the legs 58*c* to resist bending when a prying force is applied to the legs 58*c* in the direction of the arrow 90*c*. According to one or more embodiments, the legs 58*c* form a base portion of the fastener puller 50*c*.

The fastener puller 50*c* may also be coupled to a user's belt in a manner identical to that described above for the fastener pullers 50, 50*a*, and 50*b*.

Furthermore, according to one or more embodiments, instead of the legs 58, 58*a*, 58*b*, 58*c* with the hooks 62, 62*a*, 62*b*, 62*c* for engaging with the housing 14 of the stapler 10, the fastener puller 50, 50*a*, 50*b*, 50*c* may instead have a base portion thereof having an opening into which a screw may be inserted to screw onto a corresponding screw hole in the housing 14 of the stapler 10. For example, the screw may be a butterfly screw.

To remove a nail 22*b* from the workpiece, the head of the nail 22*b* is fitted into the nail slot 70*c* and the legs 58*c* are pulled away from the workpiece (in a direction of the arrow 90*c*). To remove a staple 22*a* from the workpiece, the tip portion 66*c* is slid beneath the staple 22*a* and then the legs 58*c* are pressed toward the workpiece (in a direction of the arrow 90*c*).

Figure 5:
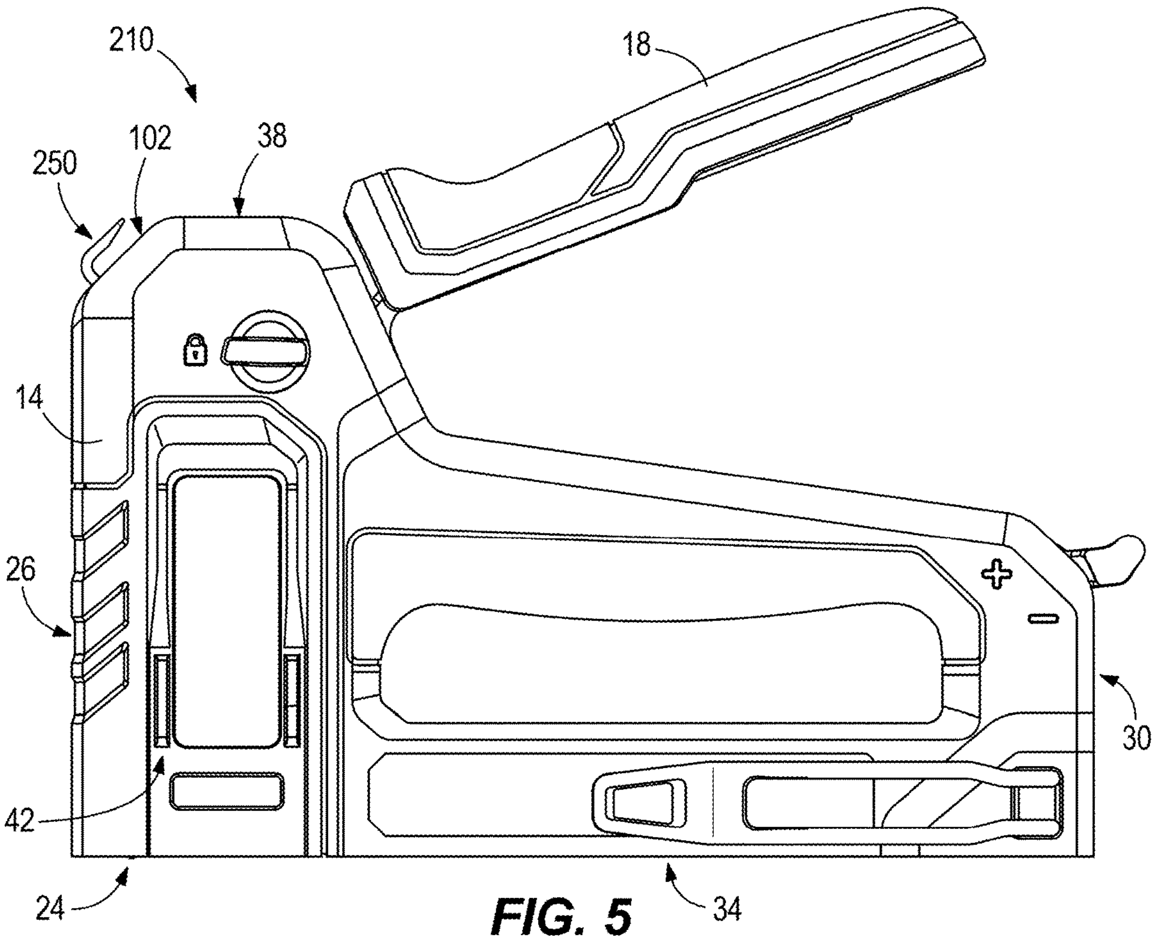
FIG. 5 is a side view of a stapler including a fastener puller, according to another embodiment.
Figure 6A:
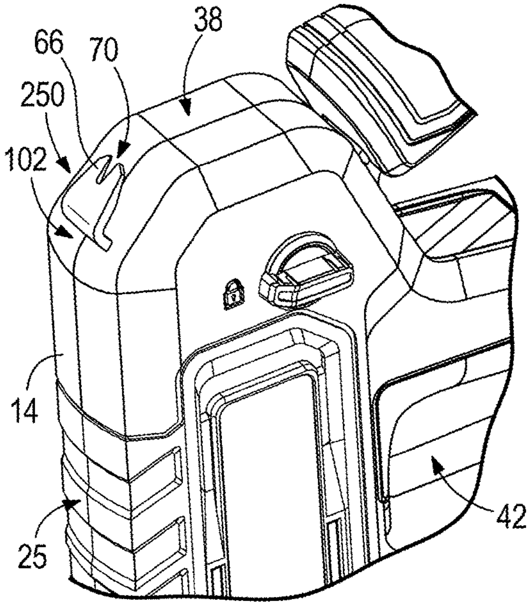
FIGS. 6A and 6B are partial perspective views of the stapler of FIG. 5.
Figure 6B:
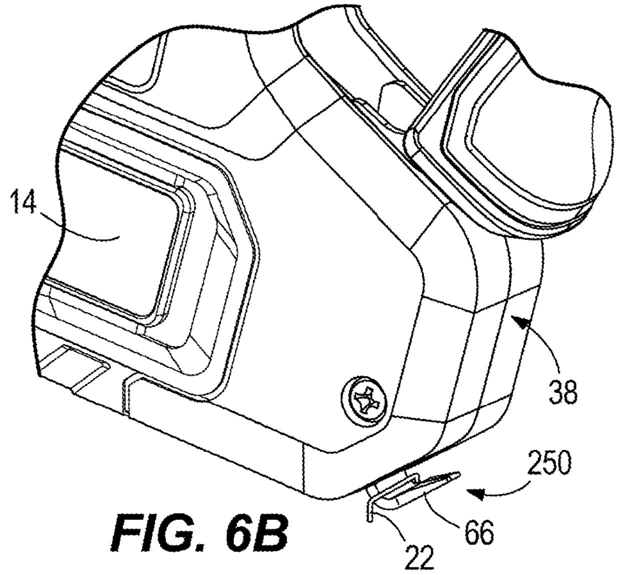
Figure 7:
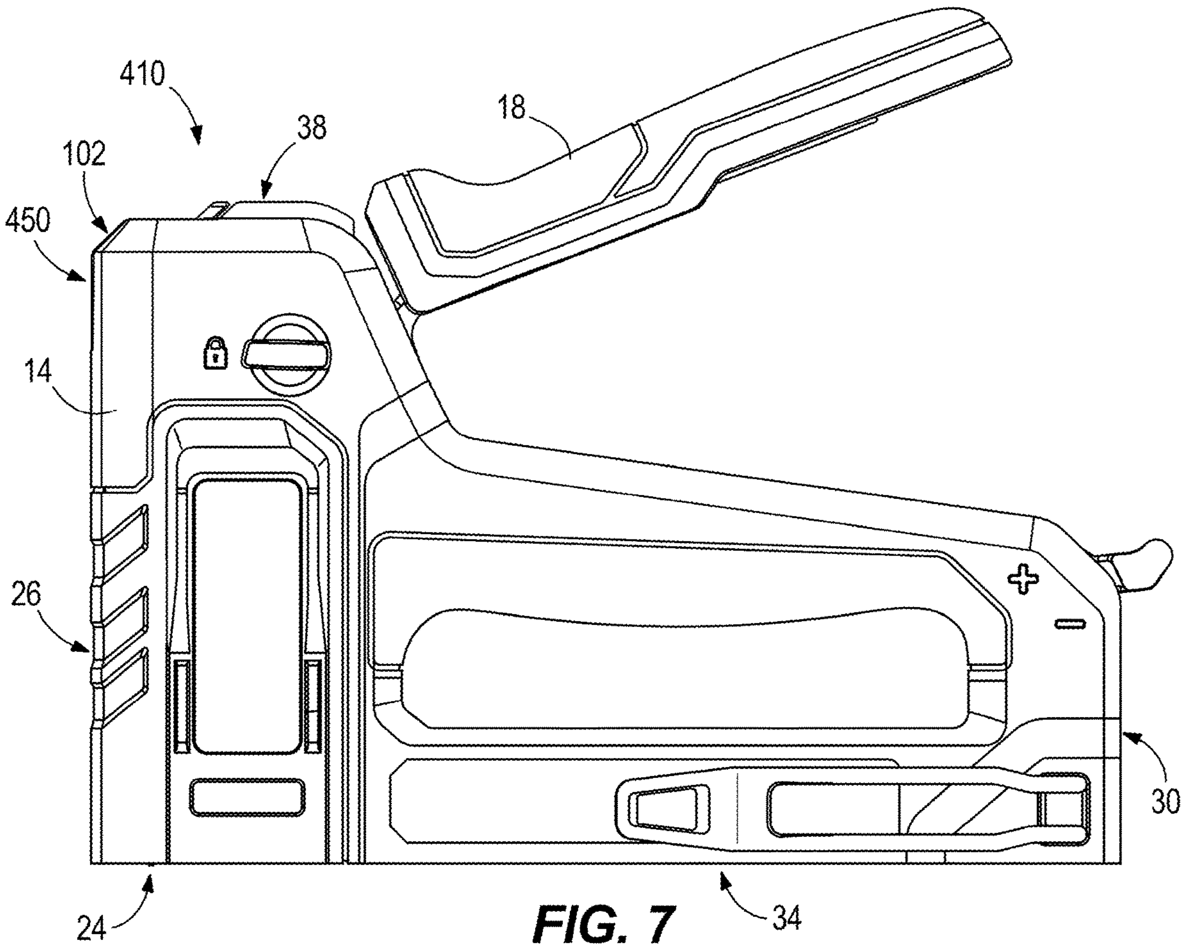
FIG. 7 is a side view of a stapler including a fastener puller, according to another embodiment.
Figure 8:
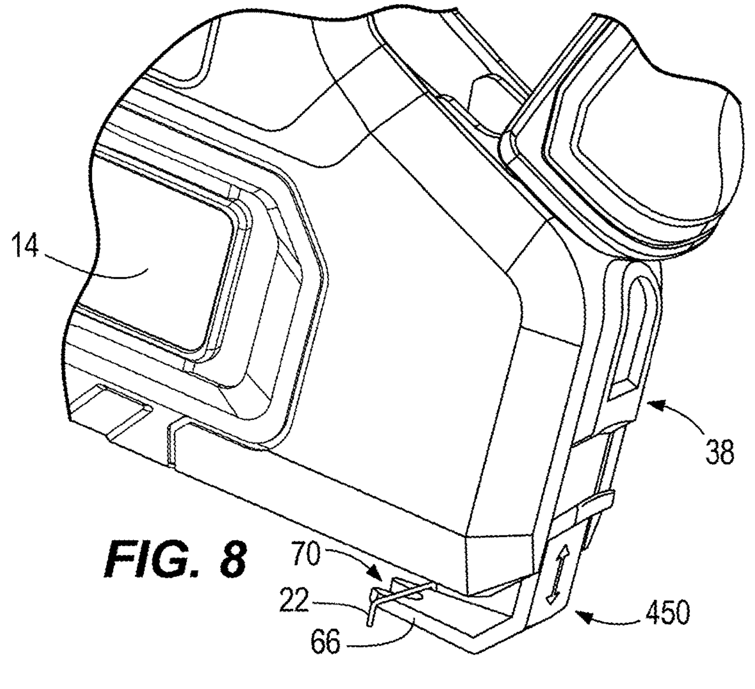
FIG. 8 is a partial perspective view of the stapler of FIG. 7.
Figure 9:
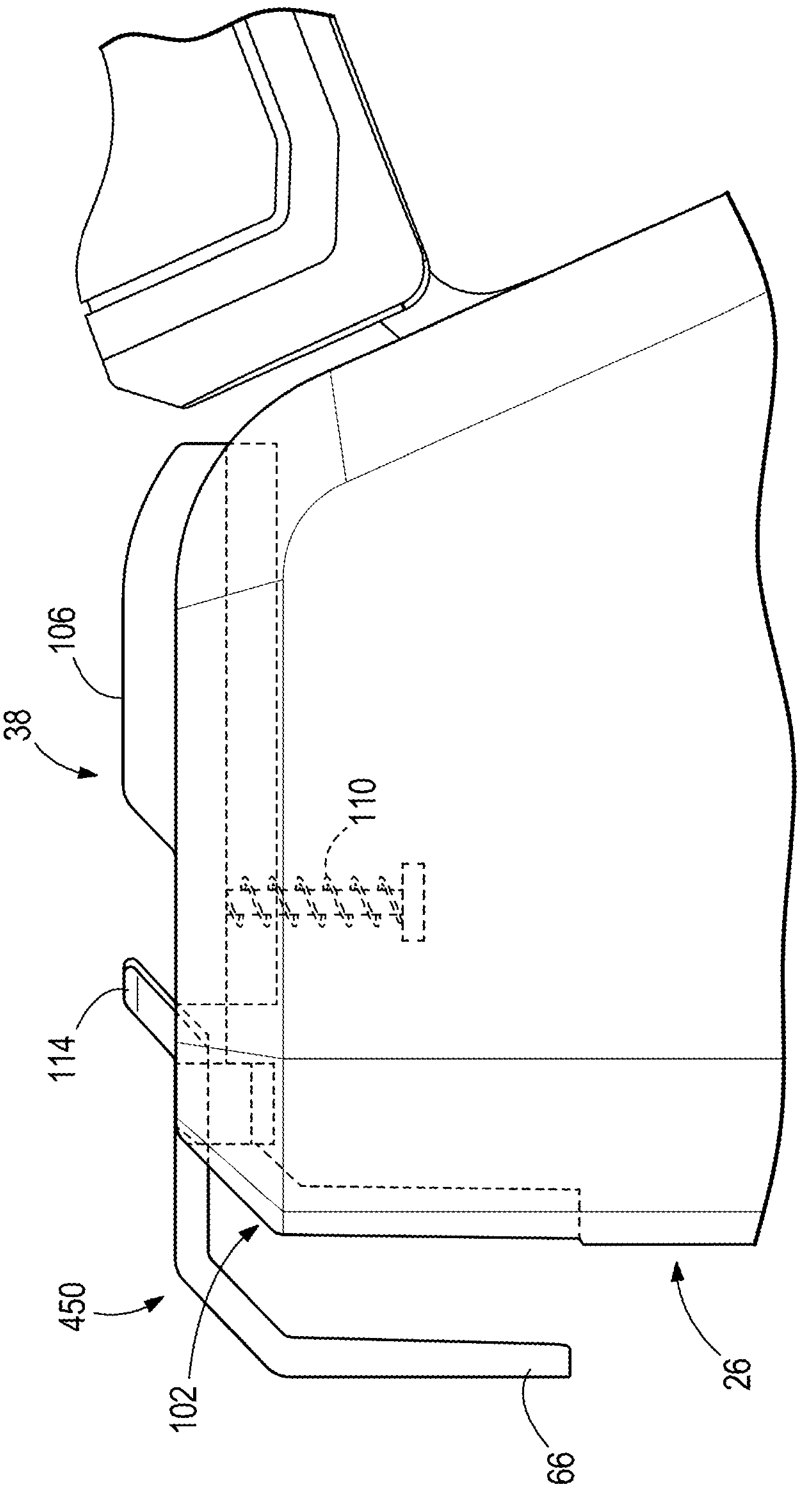
FIG. 9 is a partial side view of the stapler of FIG. 7 with portions removed.
Figure 10C:
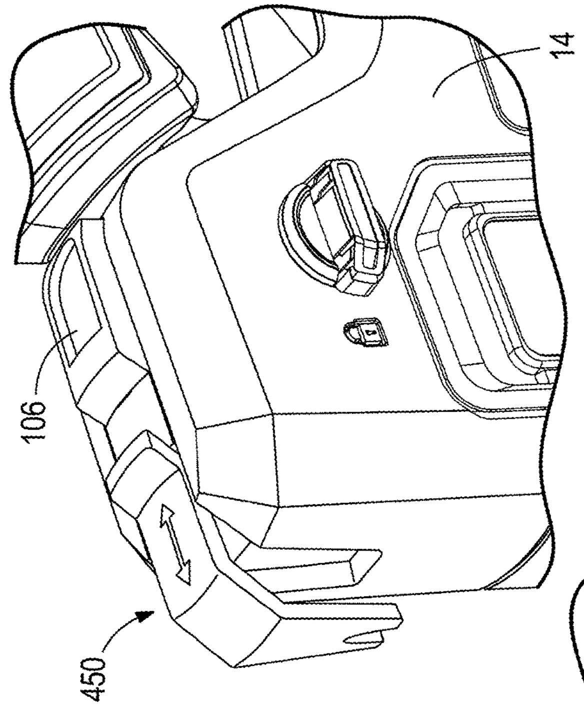
FIGS. 10A-10C are partial perspective views of the stapler of FIG. 7.
Figure 10B:
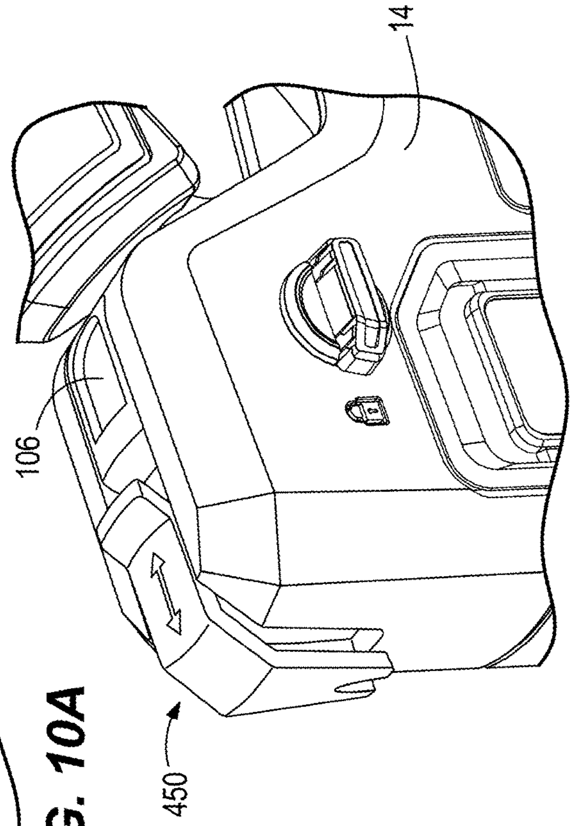
Figure 10A:
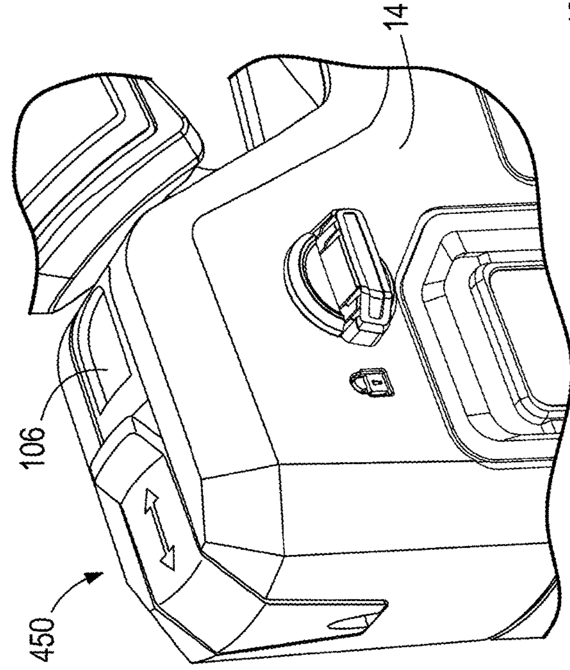
Figure 11:
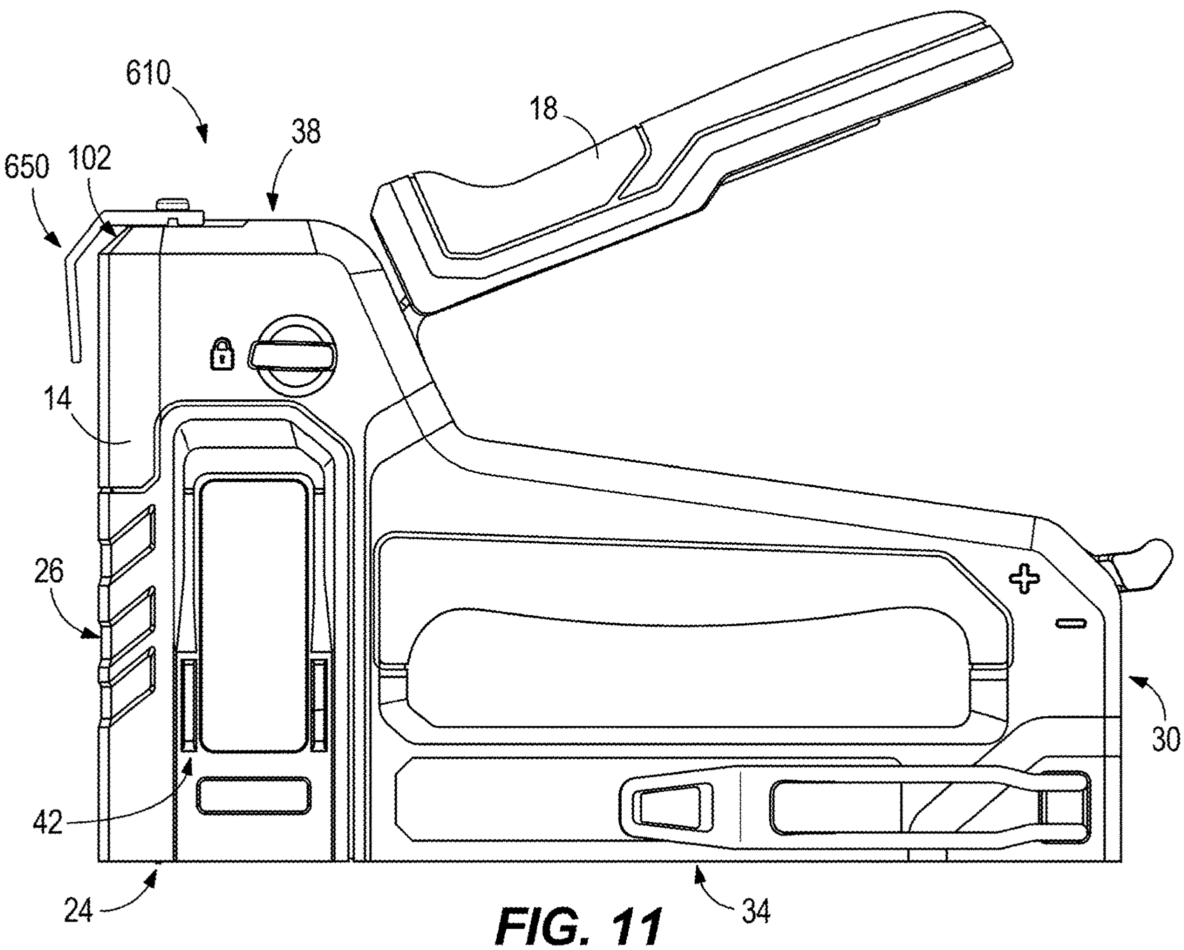
FIG. 11 is a side view of a stapler including a fastener puller, according to another embodiment.
Figure 12:
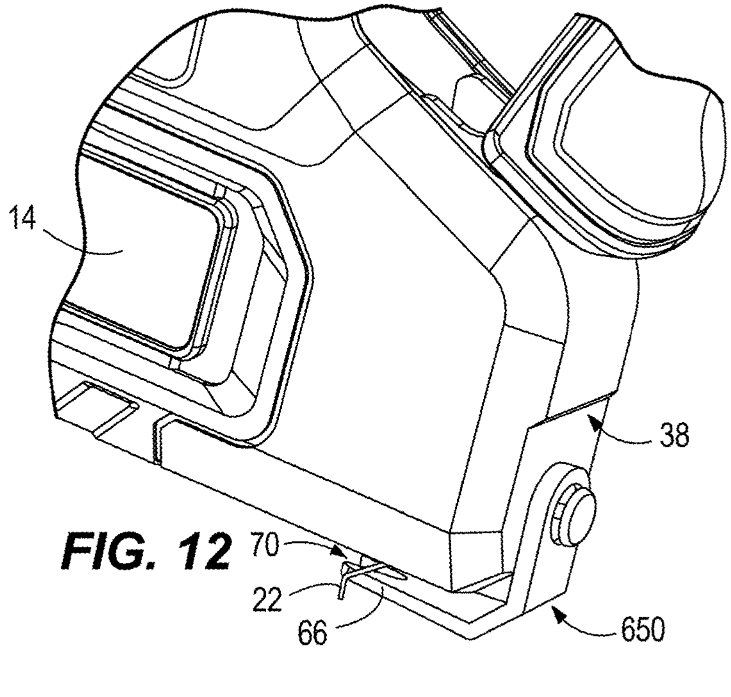
FIGS. 12-15C are partial perspective views of the stapler of FIG. 11.
Figure 13:
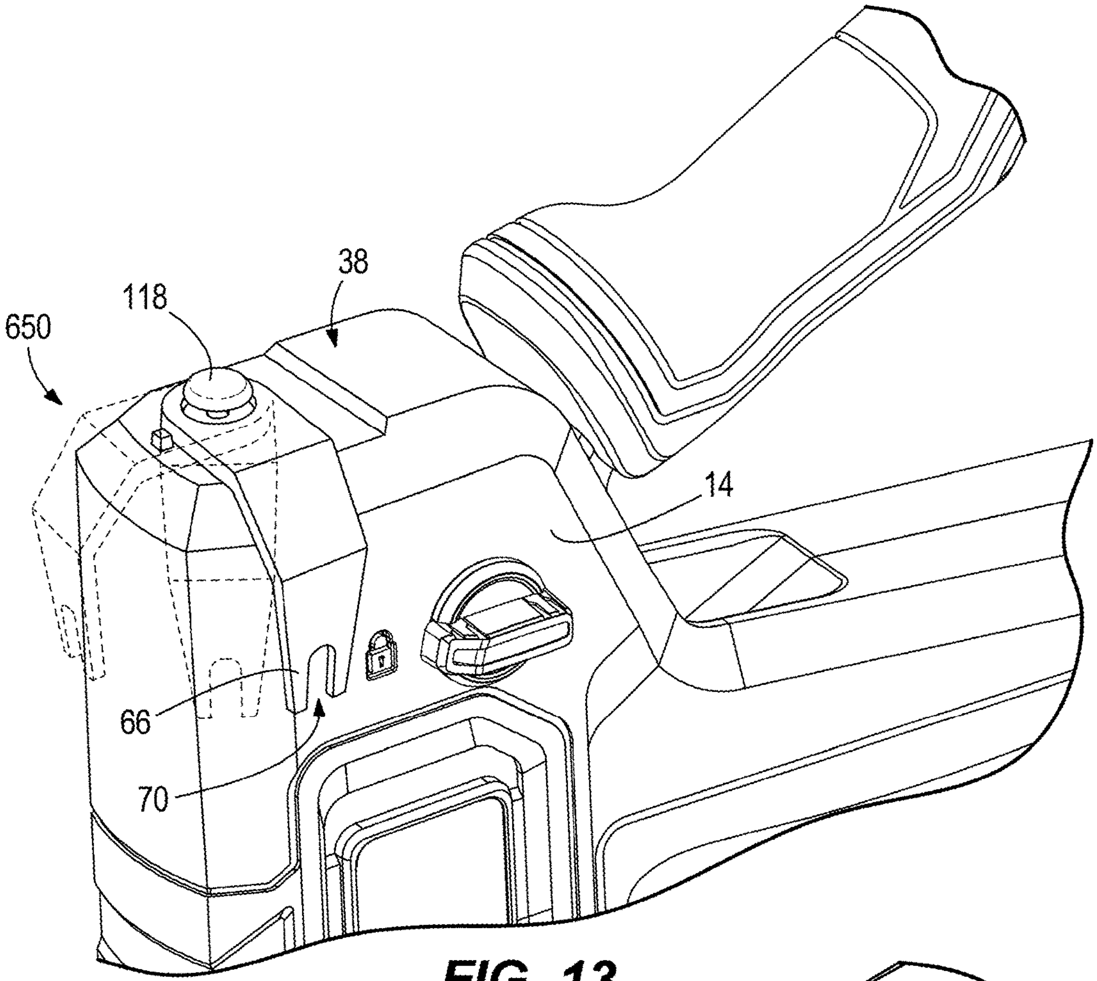
Figure 14:
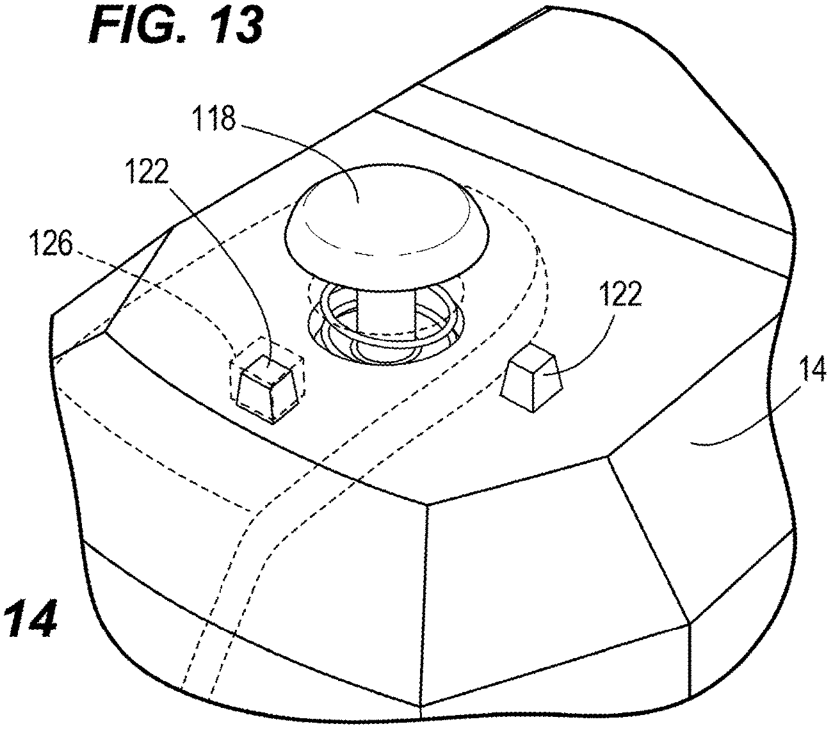
Figure 15C:
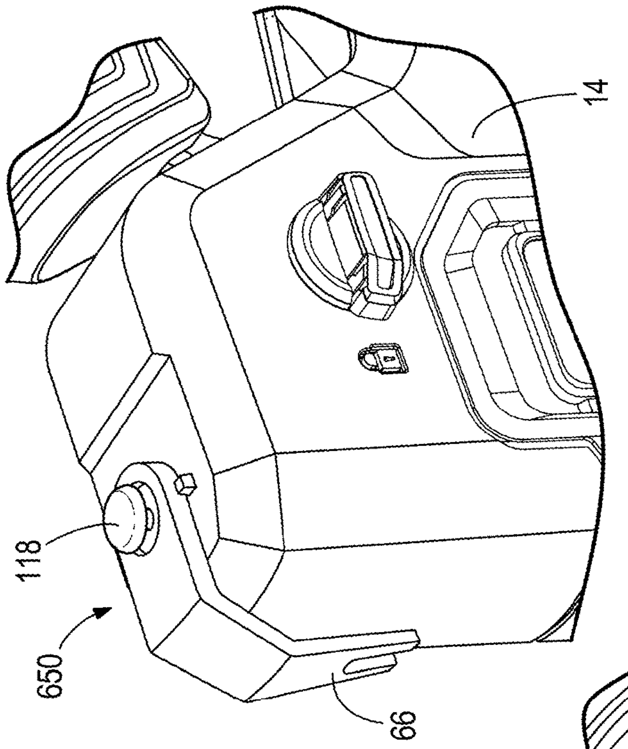
Figure 15B:
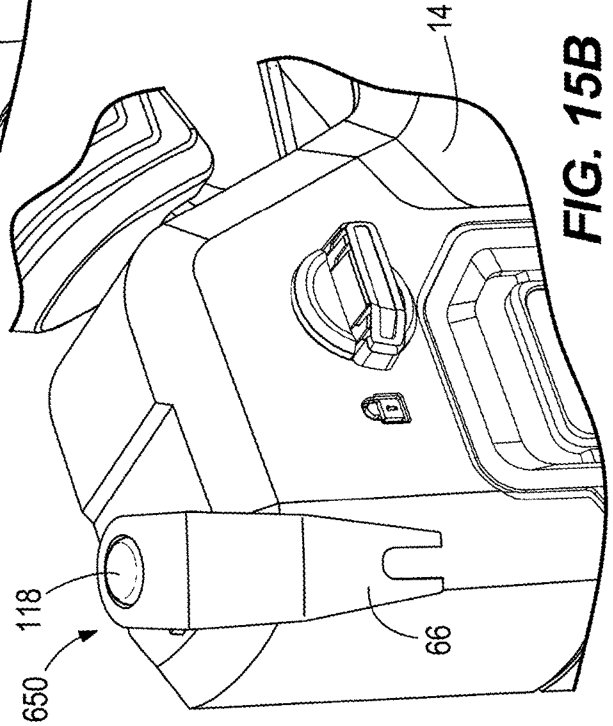
Figure 15A:
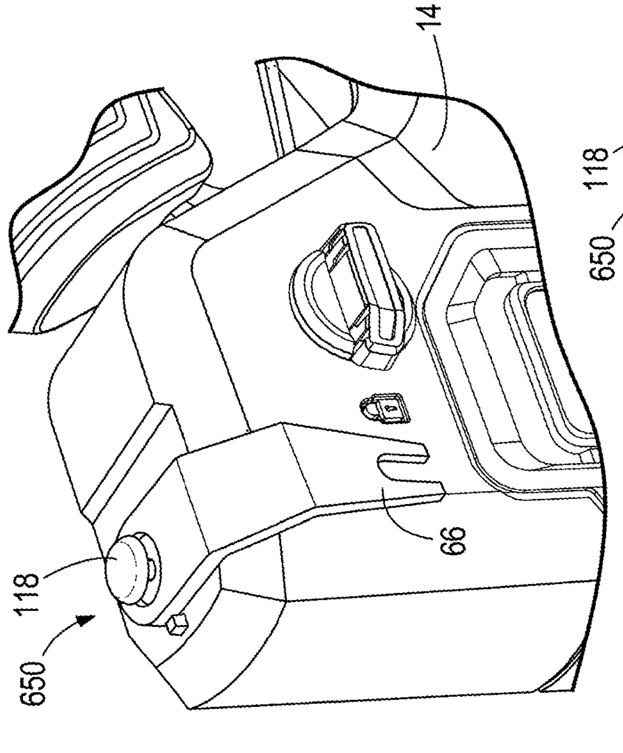

FIGS. 5-6B illustrate a stapler 210 according to another embodiment. The stapler 210 may be operable with one or more of the fastener pullers 50, 50*a*, 50*b*, and 50*c* described above. Or, the fastener pullers 50, 50*a*, 50*b*, and/or 50*c* may be omitted from the stapler 210. The stapler 210 is generally similar to the stapler 10 described above, and additionally includes an integrated or fixed fastener puller 250 that is fixedly secured to the housing 14. The fixed fastener puller 250 is affixed to a corner 102 of the housing 14 that connects the front side 26 with the top side 38. In other embodiments, (not shown), the fixed fastener puller 250 can be located in other areas of the housing 14 (e.g., the front side 26, the rear side 30, the top side 38, a corner connecting the rear side 30 and the top side 38, etc.). The fixed fastener puller 250 is generally flat and L-shaped and includes a tip portion 66 spaced apart from the corner 102 to form a gap therebetween. The tip portion 66 is forked and defines a V-shaped nail slot 70 shaped to receive a head of a nail 22*b*. The tip portion 66 has a lateral width sized to fit between the legs of a staple 22*a* as the tip portion 66 is slid underneath the top member of the staple 22*a*. In operation, the tip portion 66 is engaged with a fastener, and then the entire stapler 210 is rotated to pry the fastener away from a workpiece via the tip portion 66 as shown in FIG. 6B.

FIGS. 7-10C illustrate a stapler 410 according to another embodiment. The stapler 410 may be operable with one or more of the fastener pullers 50, 50*a*, 50*b*, 50*c* described above. Or, the fastener pullers 50, 50*a*, 50*b*, and/or 50*c* may be omitted from the stapler 410. The stapler 410 is generally similar to the stapler 10 described above, and additionally includes a retractable fastener puller 450 that is slidably coupled to the housing 14. The retractable fastener puller 450 is provided at the corner 102 of the housing 14 that connects the front side 26 with the top side 38. In other embodiments, (not shown), the retractable fastener puller 450 can be located in other areas of the housing 14 (e.g., the front side 26, the rear side 30, the top side 38, the corner connecting the rear side 30 and the top side 38, etc.). The retractable fastener puller 450 is generally flat and L-shaped and includes a tip portion 66 that is forked and defines a V-shaped nail slot 70 shaped to receive a head of a nail 22*b*. The tip portion 66 has a lateral width sized to fit between the legs of a staple 22*a* as the tip portion 66 is slid underneath the top member of the staple 22*a*.

The retractable fastener puller 450 is translatable or slidable between a retracted position (FIG. 10A) embedded flush with the surrounding surface of housing 14 and an extended position (FIG. 10C) protruding from the surrounding surface of the housing 14 so as to engage and pry a fastener 22. In the illustrated embodiment, the stapler 410 further includes an outwardly-biased lock member 106 that secures the retractable fastener puller 450 in each of the retracted and extended positions. The lock member 106 is biased outward by a biasing member or spring 110 supported within the housing 14.

To move the retractable fastener puller 450 to the extended position, the user may press a tab 114 of the retractable fastener puller 450 to slide the fastener puller 450 outward in a direction away from the housing 14. Upon moving the retractable fastener puller 450 to the extended position, the spring 110 forces the lock member 106 outward, causing the lock member 106 to abut the tab 114 and thereby hold the fastener puller 450 in the extended position. In the extended position, the retractable fastener puller 450 can be engaged with an embedded fastener 22 and the stapler 410 can be rotated to pry the fastener 22 away from the workpiece. To move the retractable fastener puller 450 to the retracted position, the user presses the lock member 106 inward (i.e., toward the housing), and then slides the retractable fastener puller 450 back toward the housing 14 to the retracted position. In the retracted position, the spring 110 presses the lock member 106 against the retractable fastener puller 450 to hold the fastener puller 450 in the retracted position.

FIGS. 11-15C illustrate a stapler 610 according to another embodiment. The stapler 610 may be operable with one or more of the fastener pullers 50, 50*a*, 50*b*, 50*c* described above. Or, the fastener pullers 50, 50*a*, 50*b*, and/or 50*c* may be omitted from the stapler 610. The stapler 610 is generally similar to the stapler 10 described above, and additionally includes a pivotable fastener puller 650 that is rotatably coupled to the housing 14. The pivotable fastener puller 650 is provided at the corner 102 of the housing 14 that connects the front side 26 with the top side 38. In other embodiments, (not shown), the pivotable fastener puller 650 can be located in other areas of the housing 14 (e.g., the front side 26, the rear side 30, the top side 38, the corner connecting the rear side 30 and the top side 38, etc.). The pivotable fastener puller 650 is generally flat and L-shaped and includes a tip portion 66 spaced apart from the corner 102 to form a gap therebetween. The tip portion 66 is forked and defines a V-shaped nail slot 70 shaped to receive a head of a nail 22*b*. The tip portion 66 has a lateral width sized to fit between the legs of a staple 22*a* as the tip portion 66 is slid underneath the top member of the staple 22*a*.

The pivotable fastener puller 650 is movable between a retracted position (FIG. 15A) with the tip portion 66 adjacent the first lateral side 42 of housing 14 and an extended position (FIG. 15C) with the tip portion 66 adjacent the front side 26 of housing 14 so as to engage and pry a fastener 22. A pin 118 rotatably secures the pivotable fastener puller 650 to the housing 14 and defines a pivot axis. The pin 118 is spring-biased toward the housing 14 (e.g., along the axis) so that the pin 118 pulls the pivotable fastener puller 650 inward toward the housing 14. A pair of locating tabs 122 are provided adjacent the pin 118 for securing the pivotable fastener puller 650 in the retracted or extended positions, respectively. Each locating tab 122 is received into a locating recess 126 formed in the pivotable fastener puller 650 when the fastener puller 650 is located in the respective retracted or extended position.

In operation, the fastener puller 650 is moved from the retracted position to the extended position by first pulling the fastener puller 650 away from the housing 14 (e.g., along the axis) to disengage the locating tab 122 from the locating recess 126. Then, the fastener puller 650 is rotated about the axis of the pin 118 to the extended position and released, such that the spring-biased pin 118 pulls the fastener puller 650 back toward the housing and the locating tab 122 is received into the locating recess 126 to secure the fastener puller 650 in the extended position. In the extended position, the pivotable fastener puller 650 can be engaged with an embedded fastener 22 and the stapler 610 can be rotated to pry the fastener 22 away from the workpiece. The pivotable fastener puller 650 can be replaced to the retracted position in a manner similar to that described above.

Various features of the disclosure are set forth in the following claims.

What is claimed is:

1. A fastener driver for driving a fastener into a workpiece, the fastener driver comprising:

a housing;

a lever pivotably coupled to the housing and actuable to cause the fastener driver to drive the fastener into the workpiece; and a fastener puller removably coupled to the housing and operable to remove the fastener from the workpiece, the fastener puller including:

a base portion having a pair of legs, a removal head affixed to the base portion and configured to pry the fastener from the workpiece, the removal head having a flat shape, and a pivot region defined between the removal head and the pair of legs, the pivot region being configured to contact the workpiece such that during operation the fastener puller pivots about the pivot region relative to the workpiece;

wherein the housing defines a recess, and wherein each of the pair of legs includes a hook configured to be inserted into the recess and engaged with the housing to couple the fastener puller to the fastener driver.

2. The fastener driver of claim 1, wherein the removal head includes a forked tip that defines a nail slot configured to receive a head of a nail.

3. The fastener driver of claim 1, wherein the removal head defines a window and includes a cross member located in the pivot region, and wherein a nail slot is defined in the cross member and is configured to receive a head of a nail.

4. The fastener driver of claim 1, wherein the pair of legs extend parallel to one another and each leg terminates with the hook at a distal end of the leg.

5. The fastener driver of claim 1, wherein the housing includes a front side, a rear side opposite the front side, a bottom side, a top side opposite the bottom side, a first lateral side, and a second lateral side opposite the first lateral side, wherein the lever is coupled to the top side, and wherein the recess is defined in the first lateral side.

6. The fastener driver of claim 1, wherein the legs are movable between a released position and a squeezed position, the hooks being located closer to one another in the squeezed position than in the released position, and the hooks being configured to engage the housing within the recess in the released position.

* * * * *